United States Patent
Chen et al.

(10) Patent No.: US 6,946,646 B2
(45) Date of Patent: Sep. 20, 2005

(54) METHOD OF EVALUATING FIBER PMD USING POLARIZATION OPTICAL TIME DOMAIN REFLECTOMETRY

(75) Inventors: Xin Chen, Corning, NY (US); Nicol A. Heron, Wilmington, NC (US); Timothy L. Hunt, Wilmington, NC (US); Eric J. Mozdy, Elmira, NY (US); Darren A. Stainer, Wilmington, NC (US)

(73) Assignee: Corning Incorporated, Corning, NY (US)

(*) Notice: Subject to any disclaimer, the term of this patent is extended or adjusted under 35 U.S.C. 154(b) by 66 days.

(21) Appl. No.: 10/287,995

(22) Filed: Nov. 5, 2002

(65) Prior Publication Data

US 2004/0084611 A1 May 6, 2004

(51) Int. Cl.[7] ............................................... G01J 4/00
(52) U.S. Cl. .................. 250/227.17; 250/226; 356/73.1
(58) Field of Search ........................ 250/225, 227.17; 356/73.1

(56) References Cited

U.S. PATENT DOCUMENTS

| | | | | |
|---|---|---|---|---|
| 5,384,635 A | * | 1/1995 | Cohen et al. | 356/73.1 |
| 5,652,715 A | | 7/1997 | Hanson | 364/574 |
| 5,966,207 A | | 10/1999 | Haskins et al. | 356/73.1 |
| 6,630,992 B1 | * | 10/2003 | Vobian et al. | 356/73.1 |
| 6,724,469 B2 | * | 4/2004 | Leblanc | 356/73.1 |
| 2004/0046955 A1 | | 3/2004 | Fayolle et al. | 356/73.1 |

FOREIGN PATENT DOCUMENTS

WO   WO2004/010098   1/2004   .......... G01M/11/02

OTHER PUBLICATIONS

A. Fougères, "Polarization OTDR: Locating High–PMD Fibers", Application Note 087, www.exfo.com, ANOTE087.lan, © 2002 Exfo Electro–Optical Engineering Inc.

A. Fougeres et al, "Detection of high–PMD sections along installed fibers by means of a polarization OTDR", APOC 2002; Asia–Pacific and Wireless Communications, Optical Components and Transmission Systems, Shanghai, China, Oct. 16–18, 2002.

(Continued)

*Primary Examiner*—David Porta
*Assistant Examiner*—Patrick J. Lee
(74) *Attorney, Agent, or Firm*—Robert L. Carlson (57) ABSTRACT

A method for screening fiber polarization mode dispersion using a polarization optical time domain reflectometer. A pulse radiation is emitted into the fiber under test, and the backscattered radiation is measured by the POTDR and used to obtain a POTDR trace. The POTDR trace is then analyzed to compare the variation of signals along the length of the fiber, the variation in signals relating to the level of PMD along the length of the fiber. Because high levels of PMD correspond to localized levels of low variability, by setting the variability of signal threshold sufficiently low, fibers having unacceptably high localized PMD can be identified and removed.

18 Claims, 6 Drawing Sheets

OTHER PUBLICATIONS

A. Tardy et al, "Fiber PMD analysis for optical fiber cable using polarization OTDR", OFC '95 Technical Digest, Feb. 26, 1995.

X. Chen et al, "Scaling properties of polarization mode dispersion of spun fibers in the presence of random mode coupling", Optics Letters, Sep. 15, 2002, vol. 27, No. 18, pp. 1595–1597.

J.G. Ellison et al, "A Fully Polarimetric Optical Time–Domain Reflectometer", IEEE Photonics Technology Letters, vol. 10, No. 2, Feb. 1998, pp. 246–248.

A. Galtarossa et al, "Measurements of beat length and perturbation length in long single–mode fibers", Optics Letters, Mar. 15, 2000, vol. 25, No. 6, pp. 384–386.

N. Gisin et al, "Polarization Mode Dispersion of Short and Long Single–Mode Fibers", Journal of Lightwave Technology, vol. 9, No. 7, Jul. 1991, pp. 821–827.

B. Huttner et al, "Local Birefringence Measurements in Single–Mode Fibers with Coherent Optical Frequency–Domain Reflectometry", IEEE Photonics Technology Letters, vol. 10, No. 10, Oct. 1998, pp. 1458–1460.

B. Huttner et al, "Distributed PMD Measurement with a Polarization–OTDR in Optical Fibers", Journal of Lightwave Technology, vol. 17, No. 10, Oct. 1999, pp. 1843–1848.

H. Sunnerud et al, "Measurement of Polarization Mode Dispersion Accumulation Along Installed Optical Fibers", IEEE Photonics Technology Letters, vol. 11, No. 7, Jul. 1999, pp. 860–862.

M. Wegmuller et al, "Distributed Beatlength Measurement in Single–Mode Fibers With Optical Frequency–Domain Reflectometry", Journal of Lightwave Technology, vol. 20, No. 5, May 2002, pp. 828–835.

* cited by examiner

METHOD OF EVALUATING FIBER PMD USING POLARIZATION OPTICAL TIME DOMAIN REFLECTOMETRY

BACKGROUND OF THE INVENTION

1. Field of the Invention

The present invention relates generally to optical fibers, and particularly to a method for identifying optical fibers which exhibit elevated levels of polarization mode dispersion (PMD).

2. Technical Background

PMD is an important factor in the design of state-of-art fiber optic transmission systems. The effect of PMD in fiber systems is evident when, after propagating a sufficient distance in the network, one digital pulse may spread in the time domain and become indistinguishable from a nearby pulse. The pulse spreading from PMD can introduce errors into the data transmission, effectively limiting the transmission rate of the pulses or the maximum distance of the concatenated fiber medium.

PMD originates from fiber geometric deformation and stress asymmetry. Without external perturbations, the PMD grows linearly at the rate which corresponds to the level of intrinsic fiber birefringence as the fiber length increases. However, fibers are subject to random external perturbations that induce mode coupling between different polarization modes. The external mode coupling is typically characterized by the frequency of its occurrence 1/h, where h is called mode-coupling length. It has been found that, for fibers in the long length region (fiber having a length l>>h), statistically the fiber PMD is closely related to both the fiber beatlength and mode coupling length, $$PMD = \frac{\lambda}{cL_b}\sqrt{h} \qquad (1)$$

where $\lambda$ is the wavelength of the light, c is the speed of the light, $L_b$ is the beatlength of the fiber as explained in "Polarization Mode Dispersion of Short and Long Single-Mode Fibers", Journal of Lightwave Technology 9, 821 (1991). Beatlength reflects the intrinsic birefringence that is built into the fiber during the manufacturing process. Mode-coupling length reflects the impact of fiber deployments, and may change as fiber deployment conditions change. The understanding of Eq.(1) has important implications on how PMD is measured and interpreted. Measurement schemes for both fiber beatlength and PMD have been developed.

An assumption behind Eq.(1) is that the fibers are linear birefringent or unspun. In recent years, fiber spinning has been introduced during the fiber draw process to reduce fiber PMD. A significant portion of fibers sold in the market today are spun fibers. For spun fibers, in addition to its dependence on fiber birefringence and random mode coupling, fiber PMD also depends on fiber spinning parameters. For most of the cases when fiber spinning is not operated under optimal condition (e.g. when maximum PMD reduction is achieved), fiber PMD still depends on fiber birefringence or fiber beatlength (before the fiber is spun) and mode-coupling length. However, as explained in "Scaling properties of polarization mode dispersion of spun fibers in the presence of random mode coupling", OPTICS LETTERS, Vol. 27, No. 18, 1595, (2002), fiber spinning introduces an additional factor $|J_0(2\alpha/\eta)|$ for a sinusoidally spun fiber, where $J_0$ is the zero-order Bessel function, $\alpha$ is the spin magnitude and $\eta$ is the angular frequency of the sinusoidal profile, that is used to correct Eq.(1).

Fiber manufacturers are interested in providing fibers with uniformly low PMD, particularly for products targeted for high data rate, long-haul transmission systems. Unfortunately, screening fiber PMD on an entire length of fiber directly is a difficult and expensive processing step.

Traditional PMD measurements typically involve obtaining the total differential group delay (DGD) value for the whole fiber under test. When fiber DGD values are elevated beyond a reasonable level, it suggests that at least a portion of the fiber under test carries elevated PMD values, and the fiber is subsequently rejected. Conversely, when the DGD value of a fiber is low, it is natural to assume that fiber PMD is acceptable. However, in reality, the fiber PMD has a distributed nature, and consequently fiber PMD can vary from one segment along the length of the fiber to another. The whole fiber can then be considered as a concatenation of many segments of unperturbed fibers with mode-coupling happening at the junction of fiber segments. Although for a large ensemble of fibers, the overall DGD follows statistical behaviors such as those shown in Eq.(1), for an individual fiber, because of mode coupling, DGD values can be partially canceled from one segment of fiber to another segment of fiber, and the overall fiber could demonstrate a low DGD value. Thus a low value in the total DGD of the fiber under test does not necessarily imply that the fiber has uniformly low PMD values. When such fiber is deployed in the field and the mode-coupling conditions change, there is a high chance that the fiber will exhibit higher DGD values.

PMD measurement in fiber manufacturing facilities often involves measuring a small percentage of fibers, with the frequency of sampling based on process capability. During typical PMD test measurements, fiber samples having a length of about 1 km are wound on a large diameter measurement spool with low tension. This configuration ensures that the induced birefringence and PMD due to bending and winding tension is minimal. Although this type of measurement yields accurate results for the particular segment of fiber under test, it is difficult using this method of screening to deterministically filter out all fibers having unacceptable level of PMD values, due to the distributed nature of PMD. In addition, this form of screening is expensive, as the sampled fibers can not be reused. Therefore, there is a need for more robust screening method that can take the distributed nature of fiber PMD into account.

Accordingly, alternative methods that can conduct the measurements distributedly and non-destructively for identifying fibers with high PMD would be of great value to the industry in that such methods would reduce measurement (quality control) costs, and therefore overall manufacturing costs for low PMD optical fibers.

SUMMARY OF THE INVENTION

The present invention relates to a method for measuring polarization mode dispersion in an optical fiber. Radiation is emitted into a length of optical fiber. The radiation is preferably a pulsed radiation, such as from a laser source. Radiation which is backscattered or reflected back through the fiber from the emitted radiation is then measured and analyzed to obtain information about the variation in intensity of the backscattered radiation along the length of the fiber. The variation in intensity can then be related to the level of polarization mode dispersion in the optical fiber to identify regions in the length of the fiber which exhibit unacceptable levels of PMD. Such measurements can be employed to determine whether the PMD of the fiber is above a predetermined threshold at some point along the length of the fiber without having to destroy it.

A preferred source for both emitting the pulse radiation and measuring the radiation which is backscattered or reflected back through the fiber is an optical time domain reflectometer (OTDR). While OTDRs have been used to measure a variety of properties of optical fibers, they are most commonly employed to measure fiber attenuation and to identify locations where breaks or discontinuities occur in the fiber. By OTDR as used herein, we mean a device which is capable of sending a light down an optical waveguide fiber and observing the small fraction of light that is scattered back towards the detector. Typical OTDRs can resolve the intensity of radiation backscattered along the length of the fiber. Most of the OTDRs achieve this by sending pulsed radiation into the fiber under test and measuring the backscattered radiation at a given timing. While typical pulse-widths may range from 0.5 meters (5 nanoseconds) to 2000 meters (20 microseconds), the present invention preferably employs pulse widths of between about 5 and 200 ns, more preferably between about 30 and 150 ns, and most preferably between about 50 and 100 ns. Preferably, the OTDR is a polarization OTDR, which is basically an OTDR capable of emitting polarized radiation and analyzing the polarized radiation from backscattered light.

One preferred method in accordance with the present invention involves identifying regions of lower or higher variability, relative to other regions along the length of the fiber, to thereby identify areas of higher or lower polarization mode dispersion along the length of the fiber. This can be accomplished, for example, by analyzing a sliding window of data within which a standard deviation (preferably in log scale) is calculated over said window, and moving said window of data lengthwise along the length of the fiber to produce information related to the local variation along the length of the fiber. In one such embodiment, when fiber PMD values are above a certain level, the variation of signals (VOS) drops below a predetermined threshold. In such instances the fiber which falls below the predetermined threshold can then be easily identified and rejected. The predetermined threshold can be selected by mapping the variation of signals against actual measured polarization mode dispersion levels for a number of fibers of the same type. In this way, the level of variation of signals may be selected above or below which the optical fiber passes or fails for a given level of PMD.

The methods and apparatus of the present invention result in a number of advantages over previous methods for measuring PMD. First, using the methods disclosed herein, PMD measurements may be conducted non-destructively and in a distributed manner along the length of the fiber. Consequently, these methods can be used to test both newly manufactured fiber as well as fiber that is already installed in a telecommunications system. The methods described herein have proven to be useful and valid both for spun and unspun fiber products over a large set of testing data. High spatial resolution OTDRs are not needed, beyond what are already available in existing commercial OTDRs. Most importantly, using the methods disclosed herein, the PMD of a fiber can be measured along the length of the fiber without destroying it. Using the methods disclosed herein, fibers greater than 15 km long and even greater than 25 km long have been successfully analyzed for PMD. In fact, using the method disclosed herein, we have successfully evaluated PMD on fiber lengths greater than 50 km.

DETAILED DESCRIPTION OF THE PREFERRED EMBODIMENTS

Figure 1:
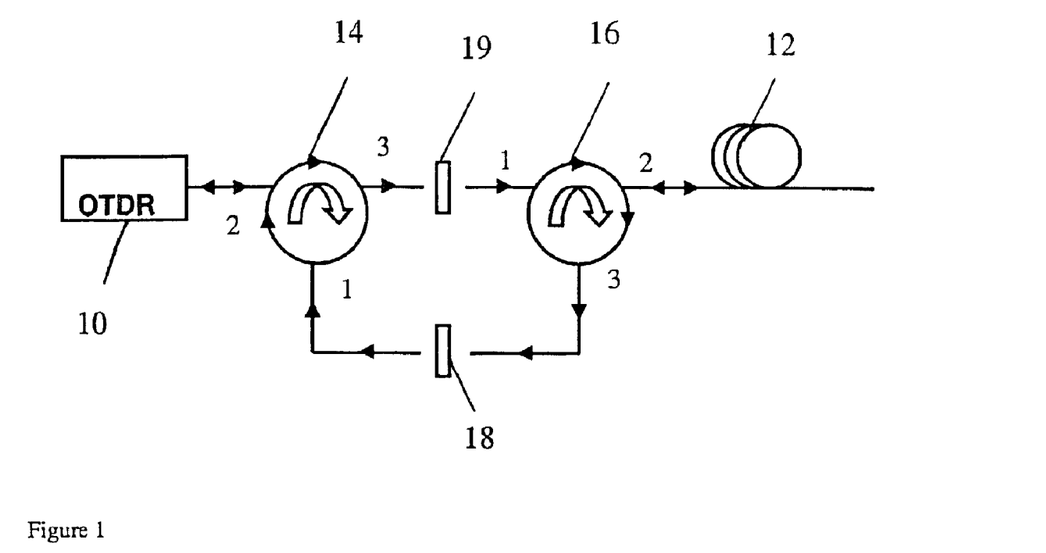
FIG. 1 illustrates a polarization OTDR which may be employed in accordance with the method of the invention.

FIG. 1 illustrates an arrangement suitable for use in practicing the method of the present invention. In FIG. 1, a conventional OTDR 10 apparatus is provided which is capable of sending a pulse of laser light down an optical waveguide fiber. The OTDR is capable of injecting a series of optical pulses into an optical fiber under test. The OTDR can also extract, from the same end of the fiber, light that is scattered back. The intensity of the return pulses is measured and integrated as a function of time, and is plotted as a function of fiber length. OTDR 10 launches a pulsed radiation into the optical fiber 12 which is to be tested for PMD. In the embodiment illustrated in FIG. 1, two optical circulators 14 and 16 and two polarizers 18 and 19 are provided. The optical circulators 14 and 16 are configured to loop the initial pulse of light emitted from the OTDR 10 to the fiber under test. As a result of rayleigh backscattering, some light is back reflected through the fiber back towards the OTDR. In a preferred embodiment, these backscattered pulses are diverted back to the OTDR through a different path. For example, in the embodiment illustrated in FIG. 1, the backscattered pulse is directed through polarization analyzer 18 (which is essentially a polarizer) before the backscattered light reaches the detector inside the OTDR. Note that in the optical circulators 14 and 16 which are illustrated, only port 2 allows the light to come in and out. The traveling of light in all other ports is unidirectional. Specifically, the light is allowed to travel from port 1 to port 2, and from port 2 to port 3 unidirectionally. The arrangement illustrated in FIG. 1 allows more light to return to the OTDR 10 if the optical pulses emitted by the OTDR are already polarized, which is the case for some commercial OTDRs. When the OTDR emission is already polarized (i.e. as in the case of a POTDR), the polarizer 19 between port 3 of optical circulator 14 and port 1 of optical circulator 16 is not needed, thus one source of loss is eliminated, which can help to gain longer dynamic range for the POTDR.

Figure 2:
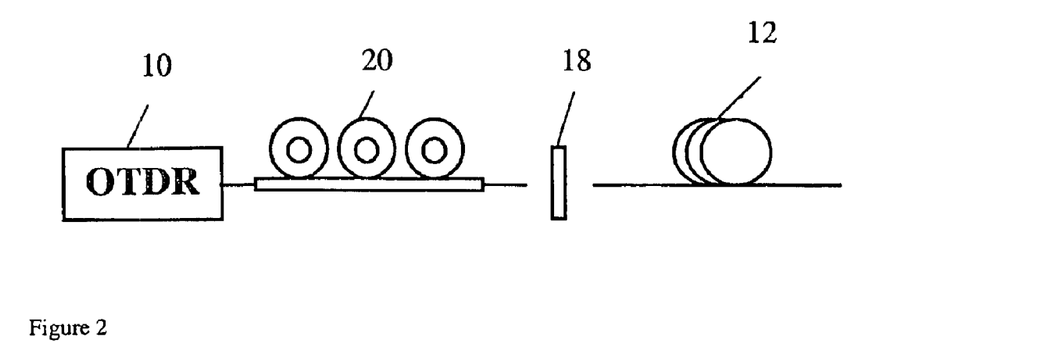
FIG. 2 illustrates an alternative polarization OTDR which may be used in accordance with the present invention.

FIG. 2 illustrates a simpler and lower cost version of an POTDR capable of being utilized in accordance with the present invention, as this embodiment avoids the use of the optical circulators which were employed in the embodiment illustrated in FIG. 1. In the embodiment illustrated in FIG. 2, OTDR 10 launches the pulse light through a polarization controller 20, which is employed to maximize the amount of light launched into the fiber under test. There are a variety of polarization controllers known in the art. The polarization controller's purpose is to align the state of polarization in the fiber to be incident on the polarizer 18. Some simple polarization controllers consist of one or more levers attached at different locations along the length of and on the outer periphery of the fiber so that the lever can be moved to thereby twist the segment of fiber so that the state of polarization in the fiber can be properly directed on the outgoing end to maximize the amount of light that goes through the polarizer. After the pulse light travels through the polarization controller 20, it is then directed through the inline fiber polarizer 18 and then into the fiber to be tested 12.

The inline fiber polarizer 18 and 19 employed in the apparatus disclosed in FIGS. 1 and 2 serves two main purposes. First, inline fiber polarizer 19 in FIGS. 1 and 18 in FIG. 2 assure that light going into the fiber under test 12 is polarized, although this could also be achieved without the inline fiber polarizer (e.g. by using an OTDR that already emits polarized light). More importantly, inline fiber polarizers 18 in FIGS. 1 and 18 in FIG. 2 serve as an analyzer for light which is backscattered back from the fiber under test to the OTDR, which light provides information on the state of polarization of the optical fiber under test 12. Without the polarizer in place to analyze the backscattered light from the fiber 12, the OTDR would only detect total intensity of the light pulse. However, by incorporating the fiber polarizer 18, information related to the state of polarization along the fiber can also be obtained. This is because, due to geometric asymmetry and strain, optical waveguide fibers carry birefringence. As a result, the state of polarization of a light pulse traveling in the fiber evolves continuously in both the forward propagating direction and backward propagating direction when the light has been backreflected. The insertion of the polarizer 18, which serves as a polarization analyzer before the OTDR detector 10, ensures that the polarization information from different locations of the fiber is captured.

Figure 3:
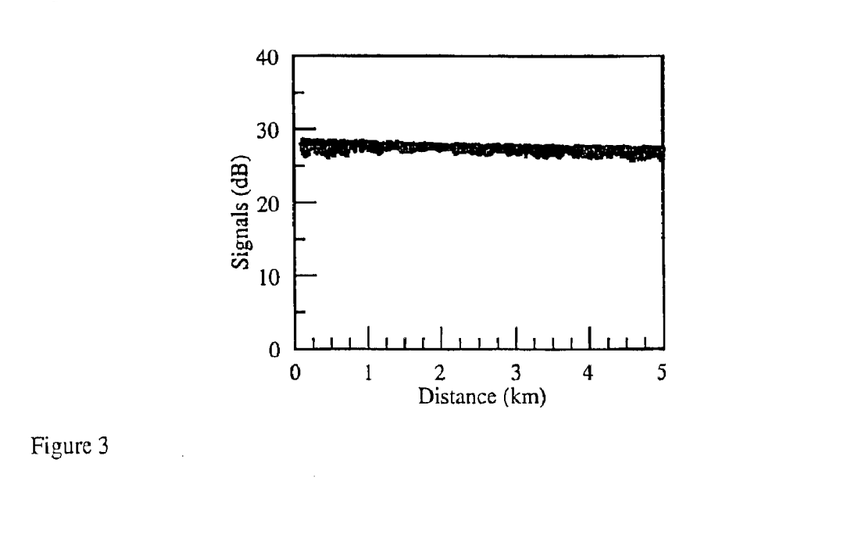
FIG. 3 illustrates a typical uncorrected POTDR trace achieved using one of the apparatus shown in FIG. 1 or FIG. 2.

FIG. 3 illustrates a raw POTDR trace taken using the setup in FIG. 2, with signals expressed in log scale in dB units versus distance along the fiber in kilometers. Similar results can also be obtained from the device illustrated in FIG. 1. Due to fiber attenuation, the POTDR trace shows a downward trend with distance, as is typical of standard OTDR traces.

Figure 4:
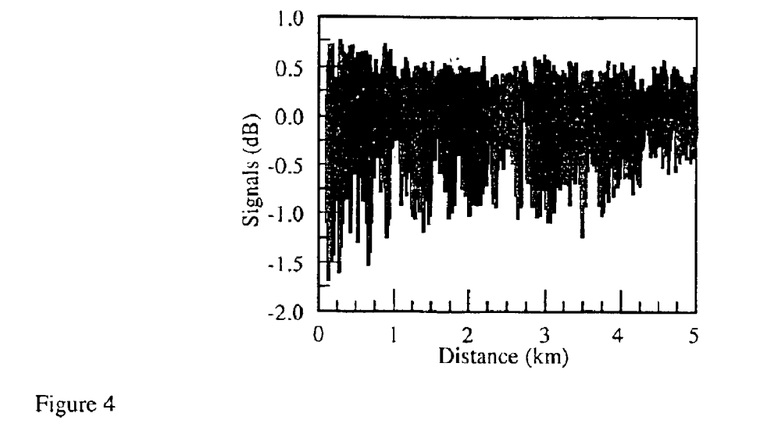
FIG. 4 illustrates a POTDR trace in accordance with the invention for the same unspun fiber illustrated in FIG. 3, but with the downward slope which is caused by attenuation removed and the Y-axis re-scaled to highlight data.
Figure 5:
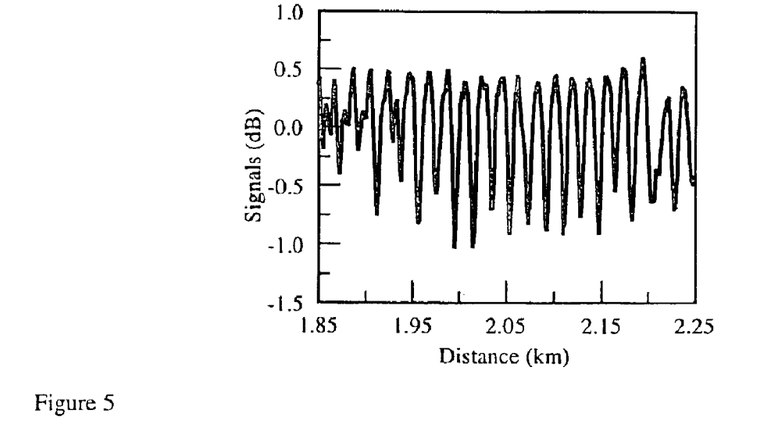
FIG. 5 illustrates a portion of FIG. 4 data over a shorter length range on the x-axis to further highlight details.

Although not necessary to practice the methods of the present invention, it may be desirable to remove the effect of the attenuation. Likewise, while not critical to protecting the invention, if desired, the data may be centered around zero. For example, a best fit of the whole set of the data may be found through a linear regression analysis, yielding a straight line with a slope which correlates to the attenuation of the fiber. Then we subtract the linear line from the original signals, so that the processed data only carries the information related to polarization. FIGS. 4 and 5 illustrate the processed data as a result of this procedure. In the trace illustrated in FIG. 4, we have corrected the overall drop of signals due to attenuation in the fiber, and centered the data around zero.

FIG. 5 displays a processed POTDR trace (same data as FIGS. 3 and 4) in a smaller spatial scale, showing a clear periodic modulation in spatial signals. The periodic nature of the trace in FIG. 5 results from the linear birefringence of the fiber. Since a polarization analyzer (polarizer) is used, the OTDR signals carry the information of state of polarization of the optical pulses backscattered from the fiber under test. As the fiber is primarily linear birefringent, the state of polarization evolves along the fiber periodically. The spacing from peak to peak is half of the fiber beatlength. Fiber beatlength is the length of fiber along which two different modes of polarization accumulate one optical wavelength of delay. The optical pulse passes the same portion of fiber twice in the standard OTDR configuration. Only half of the beatlength is needed to accumulate one optical wavelength of delay.

The behavior of periodic modulation can be understood by using a simple model. In this simple model, we consider the whole fiber as one trunk of lossless linear birefringent fiber without mode coupling. We first obtain the Jones Matrix of this linear birefringent fiber, $$T(z) = \begin{pmatrix} \cos\left(\frac{\omega\tau_0 z}{2}\right) + i\sin\left(\frac{\omega\tau_0 z}{2}\right)\cos(2\theta) & i\sin\left(\frac{\omega\tau_0 z}{2}\right)\sin(2\theta) \\ i\sin\left(\frac{\omega\tau_0 z}{2}\right)\sin(2\theta) & \cos\left(\frac{\omega\tau_0 z}{2}\right) - i\sin\left(\frac{\omega\tau_0 z}{2}\right)\cos(2\theta) \end{pmatrix} \quad (2)$$

where $\omega$ is the angular optical frequency, $\tau_0$ is the differential group delay in unit length, $\theta$ is the orientation of the fast axis, and $z$ is the position of the fiber. In OTDR, the light also backscatters, and the Jones matrix to describe the return trip is simply the transpose of matrix $T(z)$. Thus, the round trip Jones Matrix is, $$M = T^T \cdot T = \begin{pmatrix} \cos(\omega\tau_0 z) + \cos(2\theta)\sin(\omega\tau_0 z) & \sin(2\theta)\sin(\omega\tau_0 z) \\ \sin(2\theta)\sin(\omega\tau_0 z) & \cos(\omega\tau_0 z) - \cos(2\theta)\sin(\omega\tau_0 z) \end{pmatrix} \quad (3)$$

A polarizer aligned with angle $\phi$ takes the form of, $$P(\phi) = \begin{pmatrix} \cos^2(\phi) & \sin(\phi)\cos(\phi) \\ \sin(\phi)\cos(\phi) & \sin^2(\phi) \end{pmatrix} \quad (4)$$

Thus the normalized electric field after the round trip traveling is, $$\begin{pmatrix} E_{x,out} \\ E_{y,out} \end{pmatrix} = P(\phi_2) \cdot M \cdot \begin{pmatrix} \cos(\phi_1) \\ \sin(\phi_1) \end{pmatrix} \quad (5)$$

When the setup illustrated in FIG. 1 is used, the polarizer alignment angles in general take two different values, while in FIG. 2, since only one polarizer is used, there is only one value. To be able to illustrate the feature of periodic modulation in POTDR trace, it is sufficient to assume several special values of polarizer axis orientations, and orientation of fiber birefringent axis. Here, we assume $\phi_1=\phi_2=0$, and $\theta=45°$. Thus the output electric field after the round trip is, $$\begin{pmatrix} E_{x,out} \\ E_{y,out} \end{pmatrix} = \begin{pmatrix} \cos(\omega\tau_0 z) \\ 0 \end{pmatrix} \quad (6)$$

The normalized power is $$P_N = \cos^2(\omega\tau_0 z) = \frac{1}{2}(1 + \cos(2\omega\tau_0 z)).$$

The actual fiber attenuates over the length. To incorporate this effect, we need to find out the actual power that can reach the detector. The total power is thus takes the form of, $$P_T = P_S \cdot P_N \quad (7)$$

$P_S$ is the intensity of the backscattered light going to the detector in a standard OTDR $$P_S(z) = S \cdot \alpha_S \cdot D \cdot P_0 \cdot e^{-2\alpha z} = P_{S0} \cdot e^{-2\alpha z} \quad (8)$$

where $\alpha_S$ is the scattering coefficient, a is the total attenuation coefficient, $P_0$ is the peak power of the OTDR pulse, and D is the physical width of the optical pulse in fibers. Thus, the total power detected by the OTDR detector is, $$P_T = S \cdot \alpha_s \cdot D \cdot P_0 \cdot e^{-2\alpha z} \cdot \frac{1}{2}(1 + \cos(2\omega\tau_0 z)) \quad (9)$$
$$= P_{S0} \cdot e^{-2\alpha z} \cdot \frac{1}{2}(1 + \cos(2\omega\tau_0 z))$$

We can further find the linkage between the spatial period to fiber beatlength. The fiber PMD or unit length DGD is related to fiber beatlength in a simple way, $$\tau_0 = \frac{\lambda}{cL_b},$$

where $\lambda$ is the optical wavelength, c is the speed of light, and $L_b$ is the fiber beatlength. Thus we can then express the normalized power as a function of position and fiber beatlength, $$P_N = \frac{1}{2}\left(1 + \cos\left(\frac{4\pi z}{L_b}\right)\right) \quad (10)$$

The total intensity can also be obtained in a straightforward way using Eq. (7). It is shown in Eq.(10) that the signals modulate at the period of $L_b/2$, which agrees with the intuitive arguments made above.

As shown in Eq.(1), fiber beatlength is clearly correlated with fiber PMD, and is a gauge of fiber PMD level. From this equation, it follows that fiber beatlength measurement can be used to screen fiber PMD. However, most fibers exhibit different levels of non-uniformity in birefringence. Consequently, a fiber having a varying beatlength may exhibit acceptable PMD even though it may not exhibit a clear periodic POTDR trace. It is also possible that the fiber beatlength could fall below the resolution of the POTDR, in which case no judgment or the wrong judgment may be made based on fiber beatlength. This suggests that direct fiber beatlength measurement is not robust enough for fiber PMD screening. By looking at variability of the POTDR signals in time domain, we overcome the strict requirement of spatial resolution in a direct fiber beatlength measurement.

The method of the present invention is based on the observation that the variation (e.g. magnitude of signals in log scale) of the POTDR trace illustrated in FIGS. 4 and 5 is directly related to the fiber PMD level. For example, in a preferred embodiment of the invention, we set a data window size, for example, of 500 meters, for the data illustrated in FIGS. 3 and 4, and calculate the standard deviation of the processed POTDR data within that window. While the standard deviation may be calculated in linear scale, preferably it is calculated in log scale. The preferred size for the sliding data window is 500 to 1000 meters. By sliding the data window along the length of the fiber and continuously calculating standard deviation along the length of the fiber, we generate a new set of data, which we call variation of signals (VOS). The window size indicates the width of the data that is used to calculate one VOS data point. Wider window size gives less variability in the results of VOS.

Figure 6:
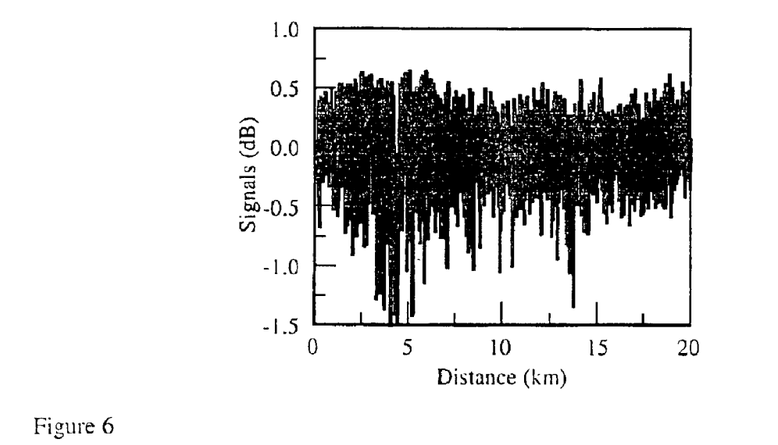
FIG. 6 illustrates at POTDR trace in accordance with the present invention, made on standard single mode fiber which has been embedded with a fiber having PMD of 0.09 ps/sqrt (km) between 10 and 14 km.
Figure 7:
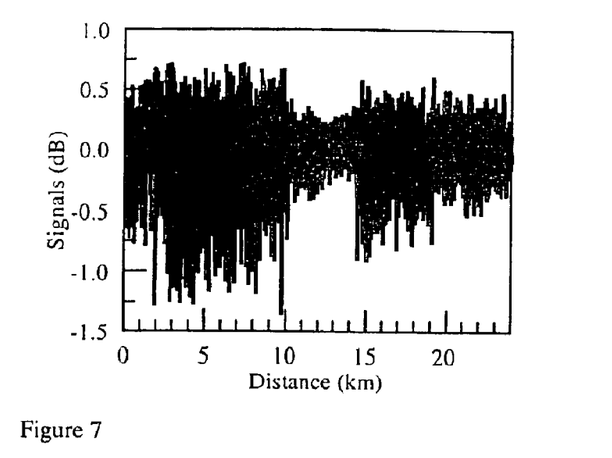
FIG. 7 illustrates a POTDR trace in accordance with the present invention, made on standard single mode fiber which has been embedded with a fiber having PMD of 0.22 ps/sqrt (km) between 10 and 14 km.
Figure 8:
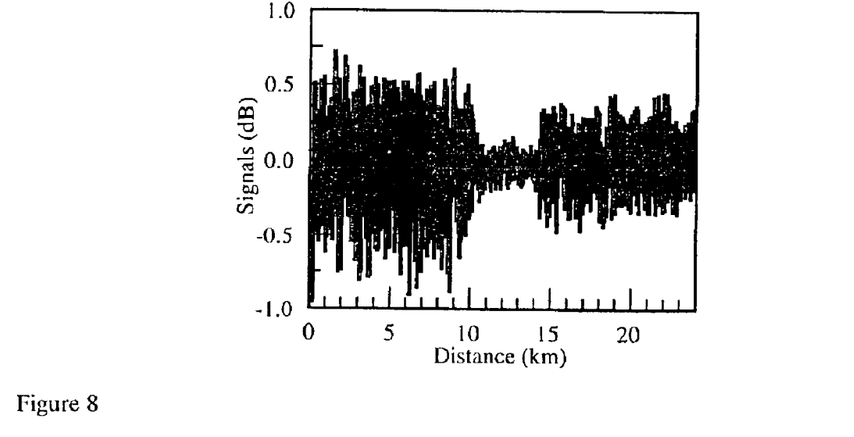
FIG. 8 illustrates at POTDR trace in accordance with the present invention, made on standard single mode fiber which has been embedded with a fiber having PMD of 0.49 ps/sqrt (km) between 10 and 14 km.
Figure 9:
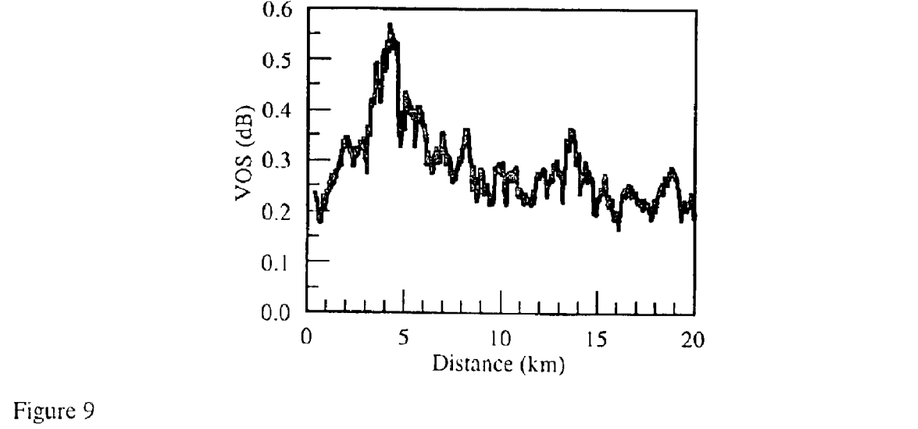
FIG. 9 illustrates a variation of signal (VOS) POTDR trace made in accordance with a preferred embodiment of the present invention using a pulse-width of 100 ns on a standard single mode fiber which has been embedded with fibers having PMD of 0.09 ps/sqrt (km) between 10 and 14 km.
Figure 10:
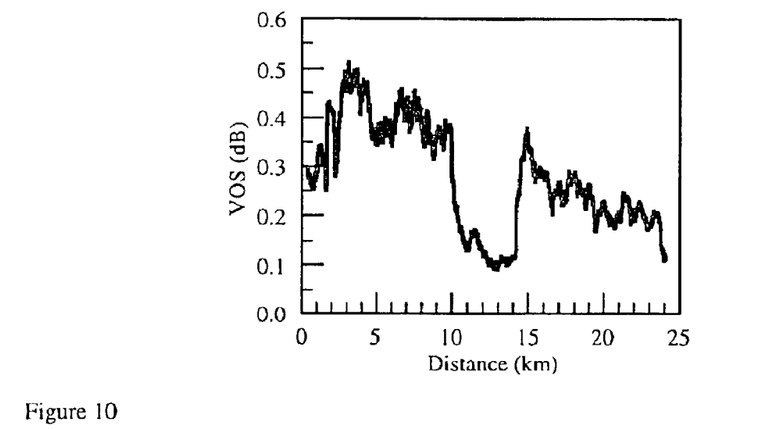
FIG. 10 illustrates a VOS POTDR trace made in accordance with a preferred embodiment of the present invention using a pulse-width of 100 ns on a standard single mode fiber which has been embedded with fibers having PMD of 0.22 ps/sqrt (km) between 10 and 14 km.
Figure 11:
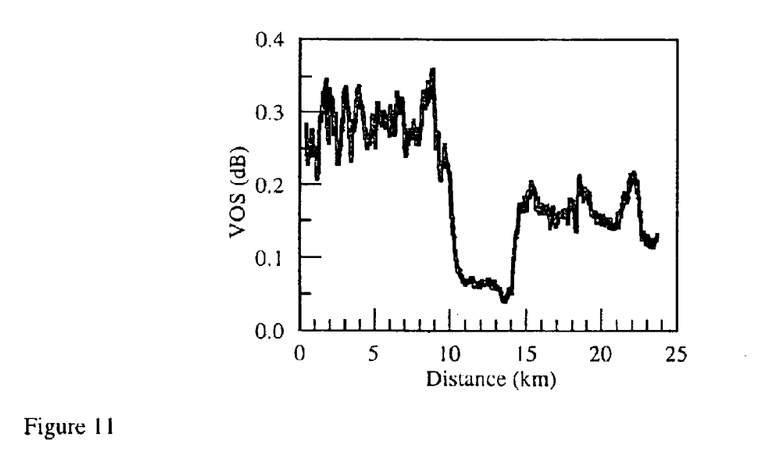
FIG. 11 illustrates a VOS POTDR trace made in accordance with a preferred embodiment of the present invention using a pulse-width of 100 ns on a standard single mode fiber which has been embedded with fibers having PMD of 0.49 ps/sqrt (km) between 10 and 14 km.

To illustrate the principle discussed above, FIGS. 6–11 show POTDR traces made in accordance with the present invention, for a single mode unspun (linear birefringent) fiber which has been embedded with fibers having different levels of PMD. In particular, the defective fibers had PMD values of 0.09 ps/sqrt (km) in FIG. 6, 0.22 ps/sqrt (km) in FIG. 7, and 0.49 ps/sqrt (km) in FIG. 8. FIGS. 9–11 show the VOS based on 500 m sliding data windows. The fibers used to produce the data in FIGS. 6–8 are the same fibers used to produce the data in FIGS. 9–11. In each case in the fibers illustrated in FIGS. 6–11, the defective fibers are located from around 10 km to 14 km. All of the data illustrated in FIGS. 6–11 have had the effect of the attenuation removed, as discussed above. The measurements were conducted using a HP8147 OTDR (manufactured by Agilent Technologies located in California, USA) based POTDR with a 50 ns pulse width and 25 km fiber lengths. As can be clearly seen in FIGS. 6–8, as the defect PMD level increases, the range of variation in signal drops, and the defect portion is clearly seen against the normal hosting fibers. This visual observation is perhaps better gauged by generating VOS as shown in FIGS. 9–11. The VOS drops when the PMD of the defective fiber goes up.

Figure 12:
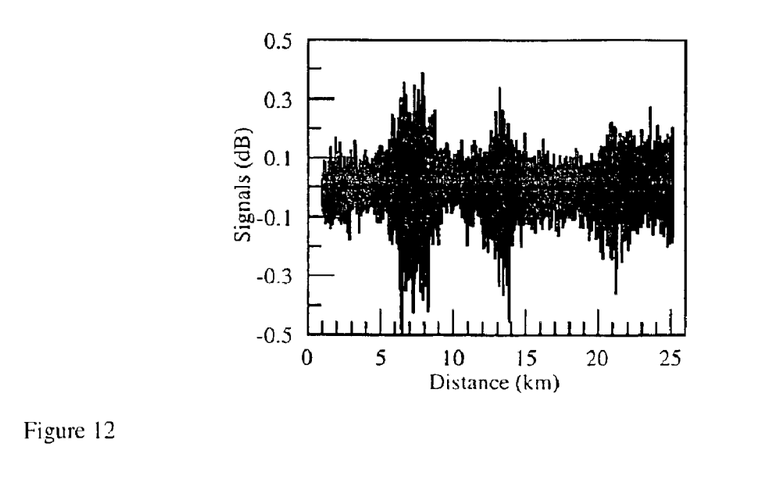
FIG. 12 illustrates processed POTDR data for an optical fiber having relatively high PMD along its length (with no intentionally spliced embedded PMD fiber).
Figure 13:
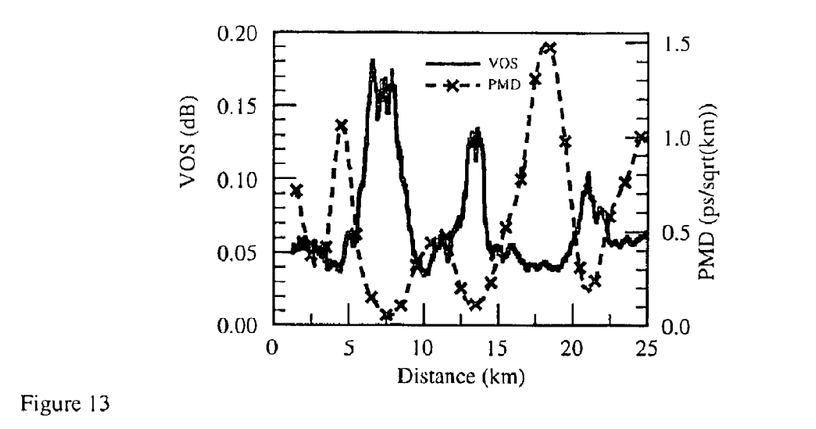
FIG. 13 illustrates a VOS POTDR trace made in accordance with a preferred embodiment of the present invention compared to PMD values from 1 km sections on the same fiber utilized used to produce the data illustrated in FIG. 12.

The fibers used in FIGS. 6–11 above employ spliced-in fiber sections having known PMD defects. To fully demonstrate the capability of the method in this invention, we show another fiber, which does not involve a segment embedded with PMD defects. The data were obtained with 100 ns OTDR pulse width. The processed POTDR data for this fiber, shown in FIG. 12, illustrates that the PMD quality of this fiber is highly non-uniform. This is confirmed by the VOS plot in FIG. 13, which plots both the VOS data and actual measured PMD data. To accomplish this, we cut the test fiber into twenty-four 1 km segments. The PMD of each segment was measured and is shown by the dashed line in FIG. 13. It is clearly seen that when areas along the length of the fiber have high VOS, the PMD is low, and when areas along the length of fiber have low VOS, the fiber PMD is high.

It is clear from the above illustration that, for a given OTDR pulse-width and optical fiber under test, the resultant amount of variation exhibited in a trace, which is achieved by using a process in accordance with the invention has a very good correlation to actual localized polarization mode dispersion. This understanding enables us to establish a procedure to screen out optical fibers having high PMD even in very localized portions (as short as 200 meters) in a length of optical fiber that is many kilometers long. To do this, we define a threshold for PMD, above which the fiber is considered defective fiber, and is rejected. To be able to establish the correlation between the VOS obtained from the POTDR trace and fiber PMD, we then appropriately select fiber samples with varying levels of PMD spreading over the range from below the threshold to well above the threshold. In the next step, The VOS of these fibers for a given OTDR pulse width is obtained. The relation between the PMD and the VOS can then be empirically established. In particular, the threshold can be found by setting a VOS threshold level below which the fibers have failing values, and above which fibers have passing values. For example, in FIG. 10, the threshold for VOS might be set to be 0.15, which in the case of this particular fiber, corresponds to a PMD threshold of about 0.15 ps/sqrt(km). In other words, below the VOS threshold of 0.15 dB, the fiber PMD will be higher than 0.15 ps/sqrt(km).

The validity of the measurement method and procedures described above can be further understood with references to the above-described mathematical formalism to explain the spatial periodic modulation of POTDR trace. The first aspect here is that all POTDR signals from OTDR are expressed in log scales. This affects several important features of current invention. From Eqs(7–8), we can cast the total intensity detected by the detector into a simple form, $$P_T = P_{S0} \cdot P_N(z) \cdot e^{-2\alpha z} \quad (11)$$

The actual signals obtained from the OTDR are expressed in log scale, thus we have, $$P_L = 5\log(P_T) = 5\log(P_{S0}) - \frac{10}{\ln(10)} \cdot \alpha z + 5\log(P_n(z)) \quad (12)$$

Eq.(12) provides us with insight to several important features. The first term in the right hand side of Eq.(12) ($5\log(P_{SO})$) is related to the OTDR launching power and fiber type. When the measurement is conducted in one type of fiber, this term does not have position dependence. Thus, it only provides an overall offset to the POTDR signals. In addition, we also find that when the launching power is changed from one measurement to another measurement, the only effect is an offset of the overall signals. The variation of the POTDR signals does not scale with the launching power. This feature simplifies the whole measurement procedures because no special care is needed when the launching power is changed from one measurement to another. The second term $$\left(\frac{10}{\ln(10)} \cdot \alpha z\right)$$

describes the fiber attenuation. Because of the attenuation, the total POTDR signals in log scale is a straight line of negative slope with the polarization information embedded in the local fluctuation of the POTDR signals. The procedure described above to remove the straight line with the help of linear regression essentially remove this second term in Eq.(12) which is due to attenuation effects. The third term ($5\log(P_n(z))$) carries the polarization information and is position dependent. Thus when processed POTDR signals are obtained as shown in FIG. 4, they are essentially due to the third term in Eq. (12), which only describes the polarization effect.

An OTDR pulse has a finite pulse width. The smallest pulse width available in commercial OTDRs is in the order of 5 ns, or roughly 1 m physical length D within the fiber. Different portions of the optical pulse exhibit different states of polarization in the fiber. At a given moment, the detector sees light returning from location L and L-D/2. The detector actually sees averaged polarization information over the length of D/2. More averaging happens when fiber has larger birefringence or PMD as more state of polarization variations occur within one optical pulse. This results in reduced variation of POTDR signals as illustrated in the VOS obtained in FIG. 10 or 11 for the portion of fiber which exhibit elevated PMD. The detector signals with such averaging can be mathematically described. Note that Eq.(10) is obtained for an infinitely thin pulse width. To take the pulse width effect into account, integration is needed between L and L-D/2. Thus, we have, $$P_N(L) = \int_{L-\frac{D}{2}}^{L} \cos^2\left(\frac{2\pi z}{L_b}\right) dz \quad (13)$$

$$= \frac{D}{4} + \frac{L_b}{4\pi}\sin\left(\frac{\pi D}{L_b}\right)\cos\left(\frac{4\pi(L - D/2)}{L_b}\right)$$

We have discarded terms related to the overall offset and attenuation when we obtain Eq.(13), their effects having removed through the procedures described above. It is straightforward to see that the maximum value of $P_N$ is $$D/2 + \frac{L_b}{4\pi}\sin\left(\frac{\pi D}{L_b}\right),$$

while the minimum value is $$D/2 - \frac{L_b}{4\pi}\sin\left(\frac{\pi D}{L_b}\right).$$

Note that for typical values of OTDR physical pulse width and fiber beatlength, the term $$\sin\left(\frac{\pi D}{L_b}\right)$$

is positive. Thus we can define a new quantity which gauge the range of variation (ROV; peak-to-peak distance) of the POTDR signals when the pulse width and fiber beatlength vary, $$ROV = 5\log\left(\frac{\frac{D}{4} + \frac{L_b}{4\pi}\sin\left(\frac{\pi D}{L_B}\right)}{\frac{D}{4} - \frac{L_b}{4\pi}\sin\left(\frac{\pi D}{L_B}\right)}\right) \quad (14)$$

Figure 14:
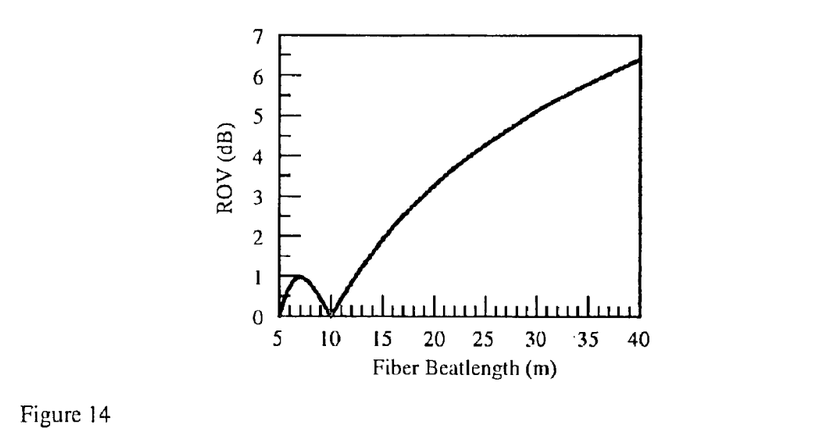
FIG. 14 illustrates the range of variation of signal (peak to peak height) as a function of fiber beat length for a fixed OTDR pulse-width (50 ns or 10 meter physical pulse-width).

ROV is similar to VOS in that they both gauge the degree of variations in POTDR signals. The choice of ROV here is for the convenience of obtaining a simple analytical equation. ROV and VOS should only be different by a constant factor. In FIG. 14, we show the ROV as a function of fiber beatlength for a fixed OTDR pulse width (50 ns or 10 m physical pulse width). It can be seen that when fiber beatlength increases and the fiber has decreased PMD, the ROV and thus VOS have increased values, which agrees with the experimental data obtained.

The method and procedures established above are particularly effective to screen fibers having PMD values above 0.05 ps/sqrt (km). In recent years, most of the fiber manufacturers specify a maximum allowable fiber PMD value, which is in the range of 0.1 to 0.3 ps/sqrt (km). Thus the process in accordance with the invention is very useful for screening the PMD quality of manufactured fibers.

Fiber winding conditions can have an effect on the PMD screening techniques described herein. The fibers used for the screening are typically wound on shipping reels having radius as small as 10 cm or less. Even for fibers with zero PMD in its straight condition, the bending and tension induced PMD can be at around 0.04 ps/sqrt (km) or above. Thus the screening threshold can not be arbitrarily lowered for such a winding condition. It is only possible when fibers are wound in spools with larger diameters.

We also find that, while a number of OTDR pulse widths are effective for the PMD screening process established in the invention, preferred pulse widths range from about 5 ns to 200 ns, more preferably from about 30 ns to 150 ns, and most preferably from about 50 ns to 100 ns. Excessively large pulse widths can become less effective for PMD screening due to significant polarization averaging within one optical pulse.

Figure 15:
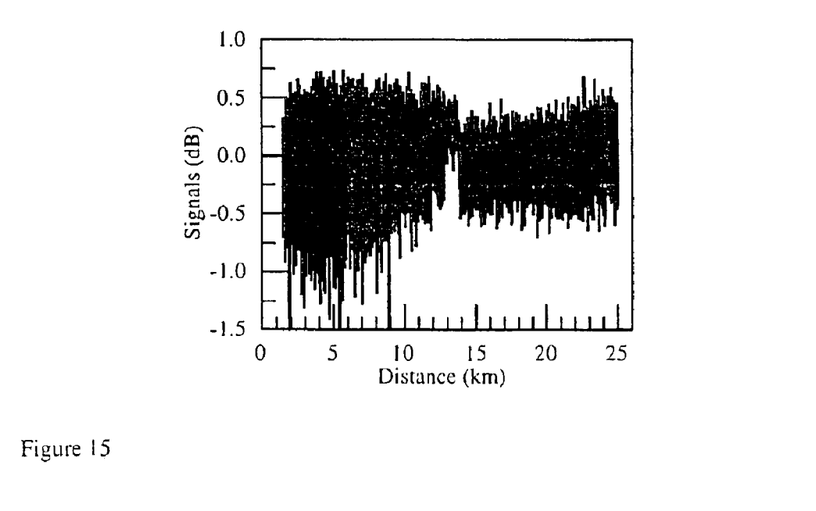
FIG. 15 illustrates a POTDR trace (100 ns pulse-width) obtained on a conventionally manufactured fiber which was spun to reduce PMD, but which had a relatively high PMD defect section intentionally embedded into the middle of the host fiber.
Figure 16:
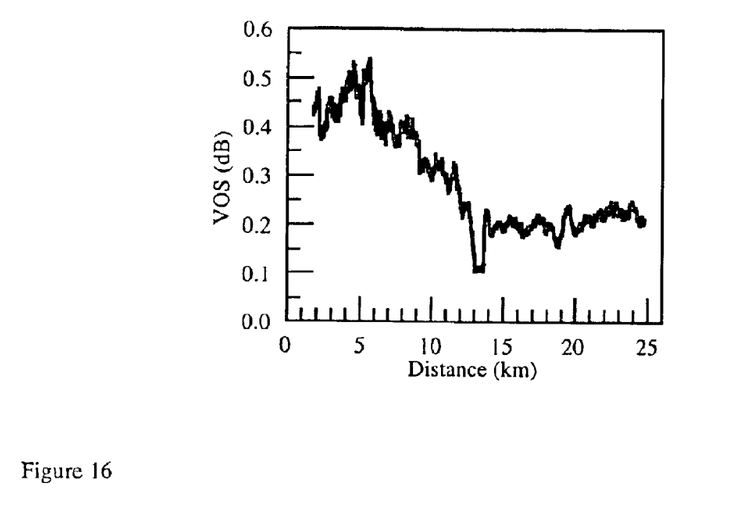
FIG. 16 illustrates a VOS POTDR trace on the same fiber used to produce the data illustrated in FIG. 15.

The method of the present invention not only has utility for measuring PMD on linear birefringent (unspun) fibers, but also spun fibers as well. For spun fibers, the evolution of the state of polarization is more complicated than in the case of unspun fibers, as the change of state of polarization spatially has been modulated by the intentionally introduced periodic spinning. Spinning is used in the fiber making process to effectively reduce the PMD in fibers with controlled mode coupling. Despite the complication due to the spinning, the basic principle behind the PMD screening discussed above still holds. The VOS remains a key gauge of the local birefringence and thus PMD in fibers. More averaging occurs for a fixed OTDR pulse width if the birefringence of spun fiber in certain region is higher than another region. Indeed, the experimental data fully supports this reasoning. In FIG. 15, a POTDR trace (100 ns pulse width) was obtained from a sample of a conventionally manufactured fiber which was spun to reduce PMD. A short piece of fibers with elevated PMD value (0.13 ps/sqrt (km)) was embedded in the middle of longer host fiber having the typical low PMD value (0.02 ps/sqrt (km)). FIG. 16 illustrates a VOS POTDR trace on the same data illustrated in FIG. 15. The reduction of variation of signals is clearly seen in FIG. 15 and FIG. 16. Similar testing has been conducted in a much larger set of fiber samples with defect fiber at different level of PMD, and data are consistent with the observation in FIG. 15 and FIG. 16.

What is claimed is:

1. A method for measuring polarization mode dispersion in an optical fiber comprising:

emitting a pulse of radiation into a length of optical fiber;

measuring radiation which is backscattered back through the fiber from said pulse radiation;

analyzing the variation of intensity level of said measured backscattered radiation and relating the level of variation of intensity level to the polarization mode dispersion (PMD) in said fiber, wherein said analyzing step comprises analyzing the variation of intensity over a sliding window of data and moving said window of data lengthwise along the length of the fiber while continuing to analyze said variation of intensity to thereby produce information related to the local variation in intensity along the length of the fiber.

2. The method of claim 1, wherein said variation of intensity level is used to locate a region along the length of the fiber which exhibits PMD which is above a predetermined threshold value for PMD.

3. The method of claim 1, wherein said analyzing step comprises assessing the variability in said backscattered intensity level along the length of said fiber, and using the variation to identify areas of higher or lower polarization mode dispersion along the length of said fiber.

4. The method of claim 1, wherein said pulse radiation is emitted from an OTDR, and said measured radiation is measured with an OTDR.

5. The method of claim 4, wherein the emitted radiation is polarized and the measured radiation which is backscattered is directed through a polarization analyzing component prior to returning to the OTDR.

6. The method of claim 1, said analyzing step comprises compiling a variation of signals (VOS) for a plurality of optical fibers having varying degrees of PMD, and the variation of signals is mapped against polarization mode dispersion levels for said fibers, and a level of variation of signals is selected above or below which the optical fiber passes or fails.

7. The method of claim 1, wherein a VOS threshold is set below which the fiber is said to have unacceptably high PMD.

8. The method of claim 1, wherein said method comprises emitting said pulse radiation into a length of optical fiber which is already installed into a telecommunications system.

9. The method of claim 1, wherein the pulse radiation in said emitting step comprises a pulse width between about 5 and 200 ns.

10. The method of claim 1, wherein the pulse radiation in said emitting step comprises a pulse width between about 30 and 150 ns.

11. The method of claim 1, wherein said pulse radiation is emitted into a length of fiber greater than 15 km, to thereby provide PMD information in said fiber which is a distance greater than 15 km from the source of the emitted radiation.

12. The method of claim 1, wherein said fiber comprises a fiber which has been spun, prior to said emitting and measuring steps, to reduce the polarization mode dispersion of said fiber.

13. The method of claim 1, wherein said pulse of radiation comprises a pulse width between 5 ns and 200 ns.

14. The method of claim 1 further comprising screening fibers which are wound on shipping reels having a radius of 10 cm or less to assure a maximum allowable fiber PMD value of no greater than 0.2 ps/√km.

15. The method of claim 1 further comprising screening fibers which are wound on shipping reels having a radius of 10 cm or less to assure a maximum allowable fiber PMD value of no greater than 0.1 ps/√km.

16. The method of claim 1, wherein said sliding window of data is 500 to 1000 meters.

17. The method of claim 1, wherein said analyzing step comprises calculating a standard deviation of said intensity over said window as the window is moved lengthwise along the length of the fiber.

18. The method of claim 17, wherein said standard deviation is calculated in log scale.

* * * * *